United States Patent [19]

Reese

[11] 4,017,278
[45] Apr. 12, 1977

[54] METHOD AND APPARATUS FOR REMOVING FINELY DIVIDED SOLIDS FROM GAS

[75] Inventor: Richard G. Reese, Woodside, Calif.
[73] Assignee: Combustion Power Company, Inc., Menlo Park, Calif.
[22] Filed: Sept. 30, 1974
[21] Appl. No.: 510,291
[52] U.S. Cl. .................................. 55/96; 55/99; 55/282; 55/337; 55/474; 55/479; 55/518
[51] Int. Cl.$^2$ ........................................ B01D 46/04
[58] Field of Search ............. 55/99, 181, 282, 329, 55/330, 390, 430, 432, 474, 479, 512, 515, 518, 30, 66, 77, 34, 79, 267, 337, 320, 96, 98; 34/174; 23/288 G, 288 K

[56] References Cited

UNITED STATES PATENTS

| | | | |
|---|---|---|---|
| 1,301,373 | 4/1919 | Briggs | 55/474 |
| 1,570,869 | 1/1926 | Thomson et al. | 55/99 |
| 1,995,293 | 3/1935 | Clark | 23/288 G |
| 2,202,258 | 5/1940 | Lynch | 55/282 |
| 2,416,230 | 2/1947 | Simpson | 55/474 X |
| 2,448,135 | 8/1948 | Becker et al. | 55/99 X |
| 2,604,187 | 7/1952 | Dorfan | 55/474 X |
| 2,854,157 | 9/1958 | Schraishohn | 23/288 G |
| 2,854,161 | 9/1958 | Payne | 23/288 G |
| 3,397,034 | 8/1968 | Tulleners et al. | 55/337 |
| 3,523,763 | 8/1970 | Van Driesen et al. | 55/474 X |
| 3,800,508 | 4/1974 | Zenz | 55/479 |
| 3,853,516 | 12/1974 | Lyshkow | 55/267 X |

FOREIGN PATENTS OR APPLICATIONS

| | | | |
|---|---|---|---|
| 899,920 | 6/1945 | France | 55/512 |
| 907,516 | 3/1946 | France | 55/390 |
| 877,536 | 12/1942 | France | 55/515 |
| 236,230 | 5/1970 | U.S.S.R. | 55/337 |

Primary Examiner—Frank W. Lutter
Assistant Examiner—David L. Lacey

[57] ABSTRACT

Finely divided solids are removed from a feed gas by passing the gas through an elongated annular mass of solid particulate contact material held between two generally concentric cylindrical walls. The outer wall is louvered having vanes outwardly inclined to the vertical at 15° to 80° and the louver openings are of such width that most of the particles of contact material are capable of passing through them. The inner wall is perforated to permit passage of gas through the wall and may be louvered similarly to the outer wall but having the louver vanes inwardly inclined. The finely divided solids are entrained or trapped in the mass of contact material which is moved downwardly through and out of the annular space between the two concentric cylindrical walls. The contact material is then treated to separate entrained finely divided solids and returned to the upper end of the annular space. Movement of the contact material through the annular space causes a small portion of it to pass through the louvers of the outer cylindrical wall preventing plugging of the louvers which would otherwise be caused by accumulation of the finely divided solids contained in the feed gas. Gas having reduced solids content is withdrawn from the space enclosed by the interior cylindrical wall. Apparatus for making the separation is described.

8 Claims, 6 Drawing Figures

METHOD AND APPARATUS FOR REMOVING FINELY DIVIDED SOLIDS FROM GAS

BACKGROUND OF THE INVENTION

The concept of separating entrained solids from gases by passing such gases through a mass of solid particulate material is not a new one. It is described in "Chemical Engineer's Handbook" (Perry, 4th Edition, McGraw-Hill) at pages 20–74. Specific applications of the concept are described in numerous patents. Each of U.S. Pat. Nos. 890,625 to T. A. Edison, 2,493,356 to Mercier et al., 3,220,165 to Howie, and 3,594,991 to Berz show methods and arrangements of apparatus for applying the concept.

Methods and apparatus heretofore described for putting the concept to practical use have been characterized by low operating factors generally attributable to complexity of design or inability to solve the plugging or pressure drop problems caused by accumulations of the entrained solids contained in the feed gas in the apparatus.

DESCRIPTION OF THE INVENTION

The present invention provides a remarkably simple process flow and arrangement of apparatus which permits continuous operation for long periods of time with highly efficient separation of entrained solids, even of sub-micron size, contained in the feed gas.

The method and apparatus of the invention are described with reference to the drawings of which:

Figure 1:
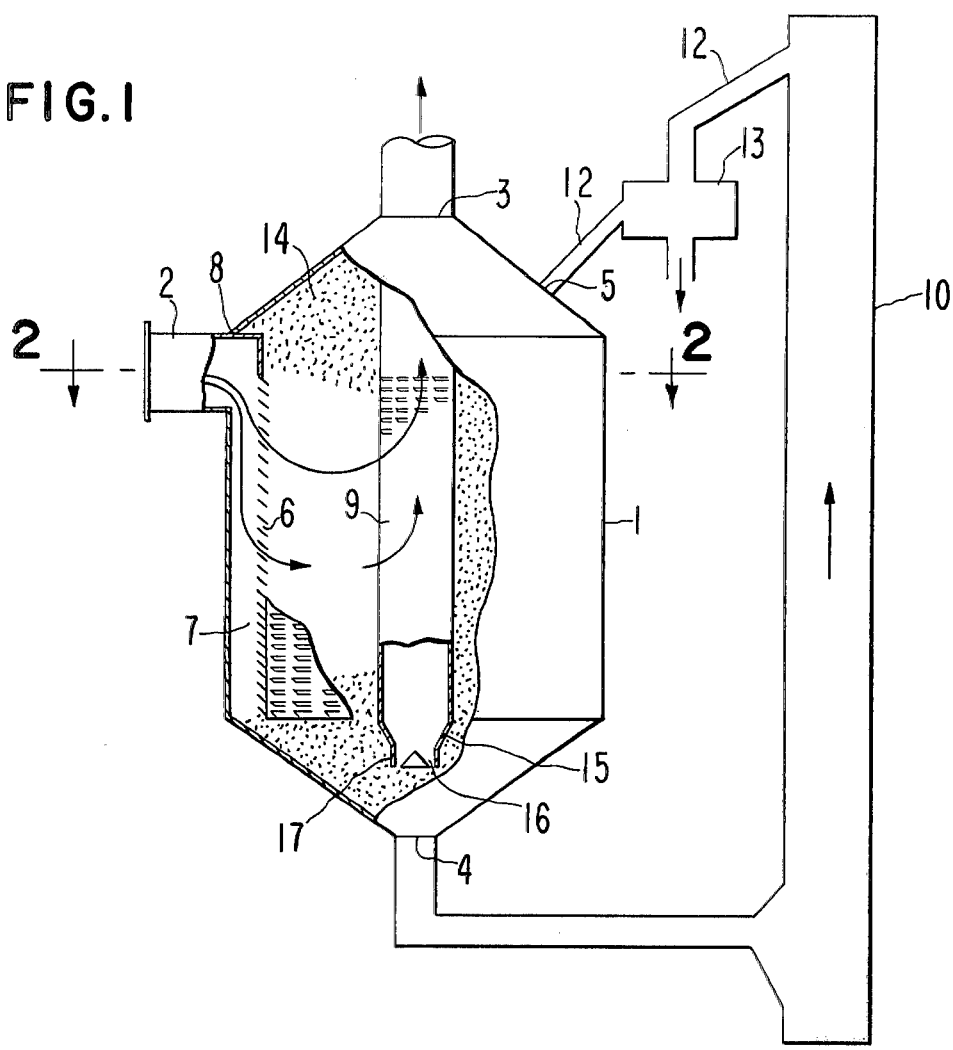
FIG. 1 is an elevational view of the separating apparatus with the interior shown in the cut-away portion of the drawing.

Referring now to FIG. 1 of the drawings, cylindrical vessel 1, usually having a flat or frusto-conical top and a tapered frusto-conical bottom, has gas inlet 2 disposed in its top, a solids outlet 4 in the bottom, and at least one solids inlet 5 laterally disposed in the top of the vessel. A first cylindrical wall member 6 having a louvered surface and a diameter smaller than that of vessel 1 is concentrically disposed in vessel 1 to leave an annular space 7 between the sidewall of vessel 1 and wall member 6. Cylindrical wall member 6 is sealed 8 at its upper end to the top of vessel 1 to close off annular space 7 at its top. Annular space 7 is open at its bottom communicating with the frusto-conical bottom of vessel 1. A second cylindrical wall member 9 having a diameter smaller than that of first cylindrical wall member 6 and having a perforate or louvered surface is concentrically disposed in first cylindrical wall member 6 to leave an annular space between the two cylindrical wall members which extends from the top to the bottom of vessel 1. Second cylindrical wall member 9 communicates with gas outlet 3 at the top of vessel 1 and generally extends beyond the top of vessel 1 as a chimney from which treated gas leaves the vessel. The lower end of cylindrical wall member 9 engages a downwardly tapering conical closure 15. Conical closure 15 is slotted at its bottom by slots 16 which are laterally shielded by shielding ring 17. Slots 16 provide communication between the interior of cylindrical wall member 9 and the frusto-conical bottom of vessel 1. A mass of particulate solid contact materials 14 fills the annular space between cylindrical wall members 6 and 9, the top portion of vessel 1 surrounding second cylindrical wall member 9 at its upper end and the frusto-conical bottom of vessel 1 so that the particulate solid material is in open communication with solids outlet 4. A first solid transport means 11 connects solids outlet 4 of vessel 1 with the lower end of exterior elevator 10. Solid transport means 11 may be any conventional solid transport means such as a mechanical vibrating conveyor, a screw conveyor or a belt conveyor. The rate at which transport means 11 is operated can be varied and thus its operation controls the rate at which the solid contact material moves downward in annular space between wall members 6 and 9. Elevator 10 may be any conventional solids conveyor suitable for transporting solids vertically. A conventional bucket elevator provides a simple and dependable vertical transport means. A second solid transport means 12 is provided to convey particulate solid materials from the top of elevator 10 to solids inlet opening 5 in the top of vessel 1. A solids separator 13, capable of separating finely divided solids from the particulate solid contact material, is inserted in the flow path traversed by one or the other of solid transport means 11 or 12. Suitable solids separators include oscillating screen separators which may be either reciprocating or gyratory screens having screens with openings sized to permit passage of the very finely divided material separated from the gas under treatment from the particulate solid contact material which circulates through the system. In the event that the finely divided solids removed from the feed gas are oily or tacky in character, they may be removed from the solid contact material by burning them off or dissolving them instead of mechanically separating them by screening.

Figure 2:
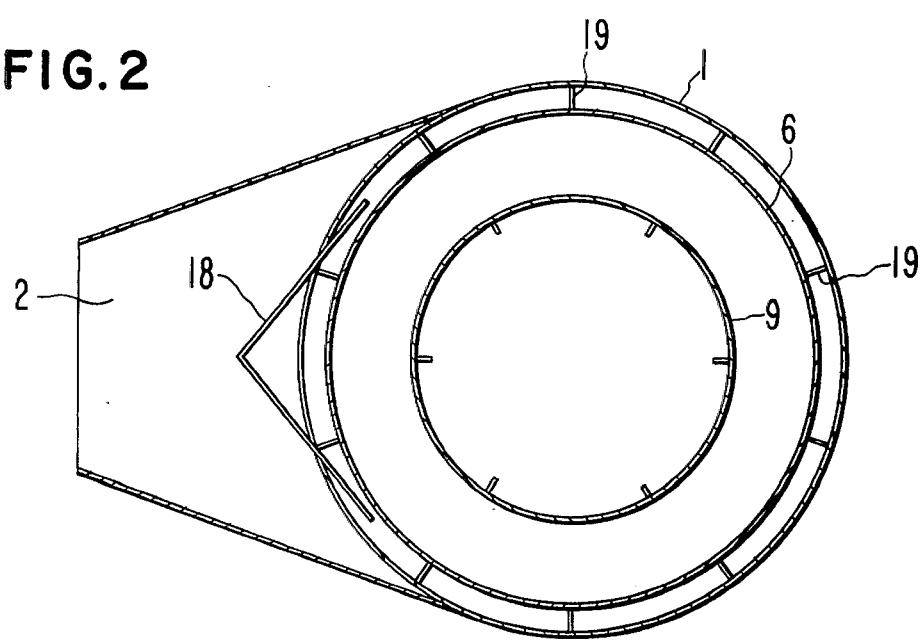
FIG. 2 is a cross-section of the separating vessel shown in FIG. 1 at 2—2.

FIG. 2 is a cross-section of vessel 1 taken at 2—2. Ribs 19 are strength members which hold first cylindrical wall member 6 in place. The ribs 19 are slotted along their entire length to permit free flow of the feed gas through annular space 7. Gas splitter 18 is a V-shaped member inserted in gas inlet 2 to direct the incoming gas into annular space 7 in both directions from inlet 2. In addition to directing the feed gas in both directions from inlet 2, splitter 18 prevents direct perpendicular contact of the feed gas with louvered wall member 6 which could result in plugging or partial plugging of the louvers in the area of direct perpendicular contact.

Figure 3:
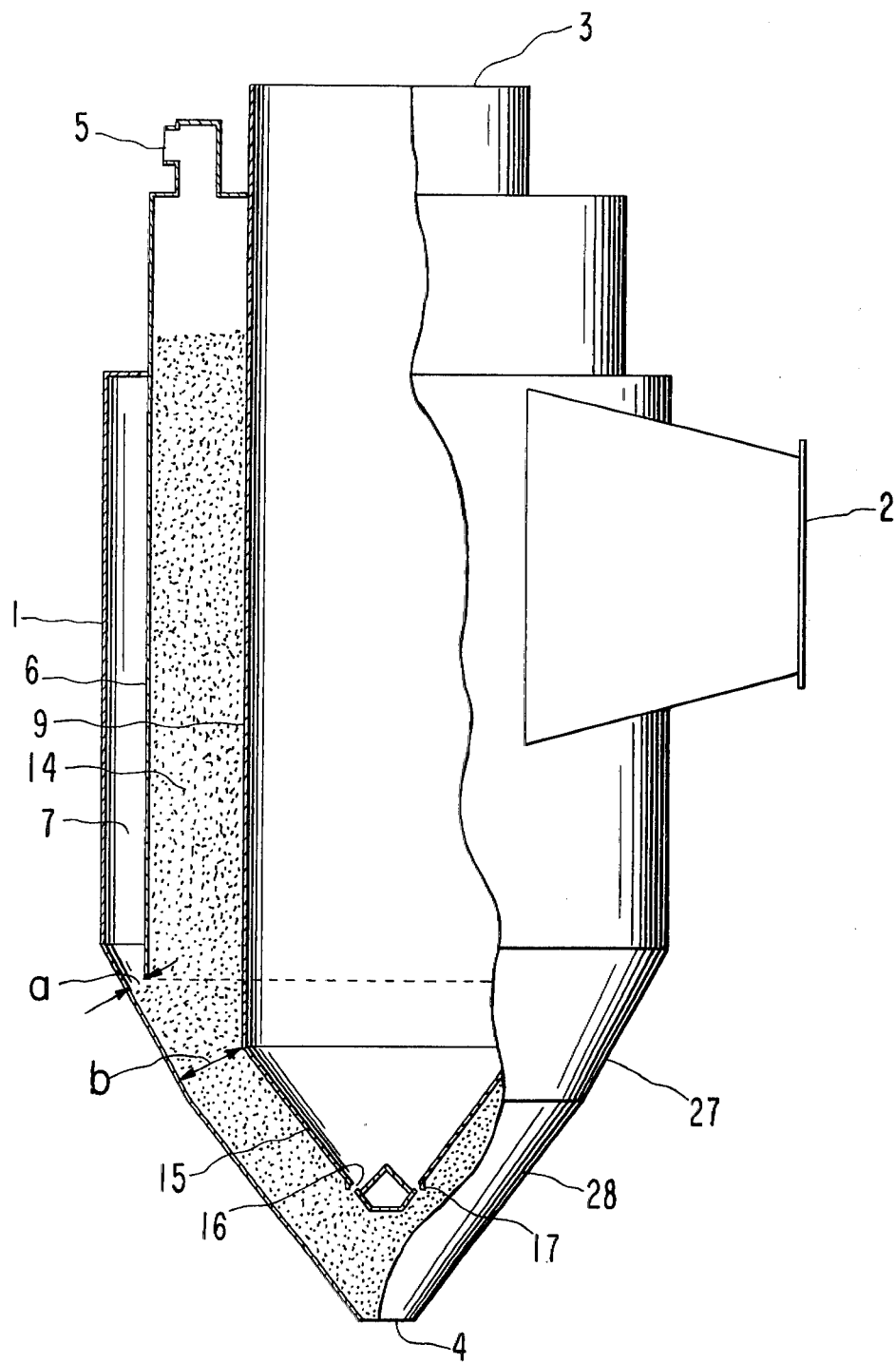
FIG. 3 is an elevational view of the separating vessel shown in FIG. 1 with interior detail being shown in the cut-away portion of the drawing.

FIG. 3 of the appended drawings is an elevational view of vessel 1 partially cut away to show the interior arrangement in greater detail, in particular, the details of the conical closure 15 at the lower end of cylindrical wall member 9, slot 16 and exterior guard ring 17.

FIG. 3 shows a particularly desirable and effective construction of the conical bottom of vessel 1. The bottom is formed of two frusto-conical members 27 and 28. The upper frusto-conical section 27 has relatively steep sidewalls, its elements being at angle from 65° to 90° relative to the horizontal, while frusto-conical section 28 has sidewalls which are less steep, its elements being at an angle of 45° to 70° relative to the horizontal. This arrangement of the two frusto-conical sections permits smooth, uninterrupted flow of the particulate solid contact material 14 from the annular space between cylindrical sidewall members 6 and 9 to solids outlet opening 4. This flow is achieved in this manner with a reduction in the overall height of vessel 1 from what its height would be if a single steep wall frusto-conical structure were employed to get dependable flow of the solid particulate contact material.

To insure that particulate solid material passing through the louvers of cylindrical wall 6 and dropping to the bottom of annular space 7 flows down and out of outlet opening 4 instead of accumulating in annular space 7 the distance $b$ between the lower end of wall 9 and conical surface 27 should not exceed about ten times the distance $a$ between the lower end of wall 6 and conical surface 27. Put another way, wall 9 should extend downward in the vessel to a point sufficiently below the lower end of wall 6 that a line joining the lower end of wall 6 to the lower end of wall 9 has a steeper angle to the horizontal than the angle of repose of the particulate solid contact material. The line referred to would, of course, be the shortest line that would connect a given point on the lower end of wall 6 with a point on the lower end of wall 9.

Figure 4:
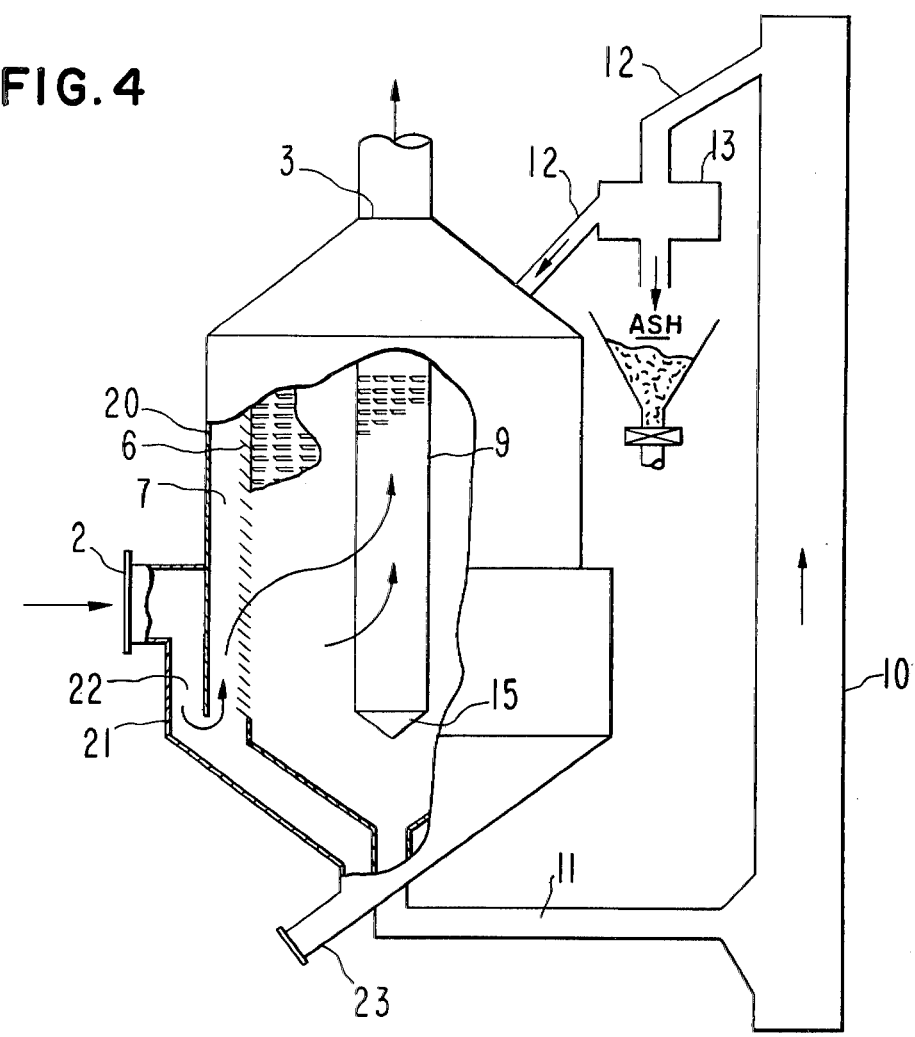
FIG. 4 is an elevational view of the separating apparatus similar to that shown in FIG. 1 in which the separating vessel has an integral cyclone separator built into it.

FIG. 4 of the drawing shows a particularly desirable embodiment of the apparatus which includes a cyclone separator as an integral part of vessel 1. In this embodiment, the cylindrical vessel is formed with an upper section 20 of relatively small diameter and a lower section 21 of relatively larger diameter. The two sections overlap so that the lower portion of upper section 20 extends into the upper portion of lower section 21 forming annular space 22 between the two sections in the area of overlap. The gas inlet opening 2 is positioned in lower section 21 and communicates with the annular space between upper section 20 and lower section 21. In this embodiment, gas inlet opening 2 is aligned relative to the vessel so that the gas enters annular space 22 along the path that is generally tangential to the cylindrical surface of upper section 20. This arrangement provides cyclone separation of most of the particles contained in the feed gas which are of about 5 microns diameter and larger. These particles are thrown out of the gas against the wall of lower section 21, drop down annular space 22, flow down the conical bottom of lower section 21 and are withdrawn from the vessel through solids outlet 23. The feed gas having passed through the cyclone separation step flows upward into annular space 7 between the walls of upper section 20 and the louvered wall of first cylindrical wall member 6 through the annular mass of particulate materials 14, through the perforate wall of second cylindrical wall member 9 and leave the vessel through outlet opening 3.

Figure 5:
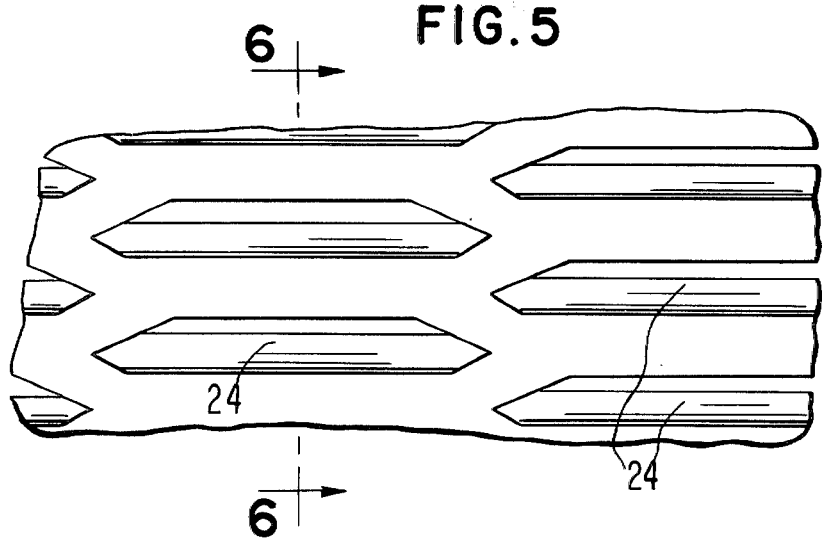
FIG. 5 is a detail of the louvered cylindrical surface wall which contains the mass of particulate material.
Figure 6:
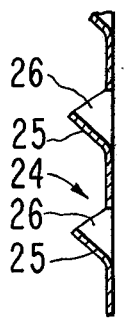
FIG. 6 is a cross section of the louvered cylindrical surface shown in FIG. 5 taking along line 6—6.

FIG. 5 of the drawing shows the detail of the louvered surface of first cylindrical wall member 6 and a section of the louvered wall. The surface of the cylindrical wall member is perforated by staggered rows of louvers 24, as shown. Louver vanes 25 slant outwardly from the surface wall member 6 and are inclined to the vertical at an angle from about 15° to 80°, preferably 30° to 50°. Louver openings 26 are just sufficiently large so that essentially all of the particles constituting a mass solid contact material 14 are capable of passing through them. The walls of a second cylindrical wall member may be similarly louvered but the louver vanes extend inwardly from the cylindrical wall member. Louver openings of 0.1 to 0.5 inches are preferred since they permit only the desired small flow of particles making up the mass of solid contact material which, for most applications, range in size from about 2 mm. to 12 mm. in diameter.

Many of the gases containing entrained solids which may be treated pursuant to the invention to remove the solids have high water vapor content ranging up to about 30 weight percent. When gases of this character are being processed, it is necessary to maintain the temperature of the interior of vessel 1 and of the particulate contact material 14 at a temperature above the dew-point of the feed gas. In order to maintain above-dew-point temperatures in the separating system, it is desirable to insulate at least the lower frusto-conical section shown in FIG. 3, the first solid transport means 11 and the lower portion of elevator 10.

OPERATION

Gases containing finely divided solids which can be treated for solids removal pursuant to the invention come from a variety of sources. Stack gases from boilers fired with waste fuel and gaseous streams containing entrained solids formed in cement plants or lime kilns are illustrative feeds. Separation is effective whether the suspended finely divided solids are of high or low density and efficient separation of solids having diameters of about 0.5 microns is obtained. Where the gas feeds have a substantial content of solid particles having diameters above about 5 microns, it is desirable to subject the gas to a cyclone separating step of moderate intensity before the gas is passed through the mass of particulate solid material. The arrangement illustrated in FIG. 4 of the drawings provides a cheap and efficient means for performing a cyclone separation step prior to contacting the gas with the mass of solid particles.

The material constituting the mass of particulate solid contact materials through which the feed gas passes should be temperature resistant at the temperature of the feed gas, preferably has rounded rather than angular surfaces to facilitate flow and prevent bridging and the particles should have reasonable uniformity in size. Particle sizes preferably range from about 2 mm. diameter to 12.5 mm. diameter. A mass of particles in which the largest particles present in substantial quantity have diameters not more than 3 to 4 times the diameter of the smallest particles present in substantial quantity is considered a reasonably uniform mass and exhibits good flow properties in the system. Coarse beach sand or finely divided gravel are cheap, readily available and constitute excellent contact masses. A San Simeon sand containing 8% U.S. sieve size No. 6, 62% U.S. sieve size No. 7, and 30% U.S. sieve size No. 8 is a satisfactory coarse beach sand. Fine gravel consisting of 66% U.S. sieve size No. 4 particles, 26% U.S. sieve size No. 5 particles, and the remainder only slightly larger than No. 4 and slightly smaller than No. 6 is a suitable fine gravel for use in the process. In the event that gas at very high temperature is to be treated then metal shot, ceramic or quartz beads and similar materials which are more resistant to temperature fracture than sand or gravel should be used as the solid contact material.

Flow rates of the feed gas through the particulate solid mass ordinarily range from about 50 to 200 feet per minute. This velocity range is not critical and velocity can be varied over a considerable range as target levels of plant through puts and efficiency of separation vary.

Pressure drop through the mass of solid particulate material is ordinarily in the range 2 to about 12 inches of water. Higher pressure drops are usually attended by higher efficiency of separation, but this is obtained at the cost of an increased energy requirement to drive the feed gas through the separation unit.

The following Table I provides data collected during the processing of boiler stack gases from boilers fired with hog fuel. Salt was added to the fuel in several runs in order to determine the effect of the presence of salt on separation efficiency. Logs which are the source of hog fuel are commonly floated in sea water or brackish water and accumulate a considerable amount of salt.

positioned about mid-way between the top and bottom of the vessel and the bottom of the vessel had the double tapered conical bottom section illustrated in FIG. 3 of the drawings. The particulate solid material employed was No. 4–No. 5 U.S. sieve size. The annular mass of particulate solid materials had a thickness of 18 inches and a height of 16 feet. The rate of flow of the mass of particulate solid material downwardly through the annulus between cylindrical wall members 6 and 9 shown in FIG. 1 was 1 foot per hour. At this rate, there was a slow, steady flow of a minor proportion of the particular solid material through the louvers of cylindrical wall member 6 into annular space 7 and thence to the bottom of the vessel and a similar slow flow of particulate solid through the louvers of the second cylindrical wall member 9 into the space enclosed by that wall member and down to the conical closure at the bottom of cylindrical wall member 9. The flow of this small amount of particulate solids through the

TABLE I

| Run No. | Media Size U.S. Sieve | Hog Fuel | Nominal Velocity (FPM) | Salt Added | Run Time Min. | Grain Loading* In | Grain Loading* Out | Pressure Drop Inches of Water Start | Pressure Drop Inches of Water End |
| --- | --- | --- | --- | --- | --- | --- | --- | --- | --- |
| 1 | No. 4 –No.5 | A | 100 | No | 60 | .505 | .029 | 7 | 10.7 |
| 2 | No. 4 – No. 5 | A&B | 150 | No | 40 | .162 | .012 | 9.6 | 12.0 |
| 3 | No. 8 – No. 10 – No. 12 | A&B | 100 | No | 35 | .250 | .007 | 26 | 28 |
| 4 | ½″ – ¼″ | A&B | 100 | No | 60 | .189 | .029 | 4.1 | 6.0 |
| 5 | ½″ – ¼″ | A&B | 150 | No | 30 | .238 | .030 | 8.0 | 9.4 |
| 6 | ½″– ¼″ | A&B | 150 | No | 30 | .414 | .033 | 10.0 | 10.2 |
| 7 | No. 4 – No. 5 | A&C | 150 | Yes | 30 | .228 | .056 | 14.2 | 16.3 |
| 8 | No. 4 – No. 5 | A&C | 150 | Yes | 20 | .161 | .034 | 16.6 | 16.9 |
| 9 | No. 4 – No. 5 | A,B&D | 100 | Yes | 30 | .276 | .061 | 10.5 | 11.9 |
| 10 | No. 4 – No. 5 | A,B&D | 100 | Yes | 30 | .206 | .039 | 11.2 | 12.2 |
| 11 | No. 4– No. 5 | A&B | 100 | No | 20 | .249 | .024 | 14.1 | 14.6 |

A - Hemlock planer shavings and plywood sander dust
B - Salt water soaked bark
C - Saline injection (20 lb NaCl + 45 Imperial gal $H_2O$ at ¾ gal/min)
D - Saline injection (1 lb NaCl + 5 lb $H_2O$)
*Grains of solid per dry standard cubic foot of gas The following Table II presents data from two runs showing the particles size distribution of the solids entrained in the feed and the efficiency of separation of these solids under the conditions of the runs.

louvers kept the louvered surfaces clean and free from deposits of the finely divided solids entrained in the gas feed. No blockages or serious pressure drop increases were experienced. The average water vapor contents of

TABLE II

| Particle Size range (microns) | Solid U.S. Sieve No. 8 – No. 10 – No. 12 at 100 Ft/Min % of Total Loading Inlet | Solid U.S. Sieve No. 8 – No. 10 – No. 12 at 100 Ft/Min % of Total Loading Outlet | Solid U.S. Sieve No. 8 – No. 10 – No. 12 at 100 Ft/Min Collection Efficiency % | Solid U.S. Sieve No. 4 – No. 5 at 150 Ft/Min Inlet | Solid U.S. Sieve No. 4 – No. 5 at 150 Ft/Min Outlet | Solid U.S. Sieve No. 4 – No. 5 at 150 Ft/Min Collection Efficiency % |
| --- | --- | --- | --- | --- | --- | --- |
| Below 0.7 | 27 | 57.5 | 93.9 | 29.5 | 72 | 65.5 |
| 0.7 to 1 | 10 | 4.5 | 98.7 | 6.5 | 5 | 89 |
| 1 to 2 | 20.5 | 10 | 98.6 | 14 | 5.5 | 94.4 |
| 2 to 3 | 9.7 | 6.5 | 98.1 | 9.5 | 2.2 | 96.7 |
| 3 to 4 | 5 | 3 | 98.2 | 6.5 | 1.1 | 97.6 |
| 4 to 6 | 5 | 3 | 98.3 | 8.2 | 1.4 | 97.5 |
| 6 to 8 | 2.4 | 1.3 | 98.4 | 4.6 | 0.8 | 97.5 |
| 8 to 10 | 1 | 1 | 97.1 | 2.7 | 0.5 | 97.4 |
| 10 to 20 | 2.1 | 2.2 | 96.9 | 6.3 | 1.5 | 96.6 |
| Above 20 | 17.3 | 11 | 98.1 | 12.2 | 10 | 88.4 |
| Overall Loading & Efficiency | (GR/1000 DSCF) 453 | (GR/1000 DSCF) 13 | % 97.1 | (GR/1000 DSCF) 335.5 | GR/1000 DSCF) 47.5 | % 85.8 |

A prototype separation unit having a design capacity of 40,000 actual-cubic feet per minute was installed at a lumber mill in Washington to process stack gases from a powerhouse boiler fired with hog fuel. The unit corresponding in general design to that illustrated in FIG. 1 of the drawings, except that the gas inlet was the feed gases was 18 percent by weight. The feed gas used in the runs was the effluent from multiclone collectors which removed the larger particles entrained solids from gas.

Data collected during six runs conducted over a period of two days is shown in the following Table III.

TABLE III

| Test No. | Sample Location | Particulate Content (GR/SDCF at 12% $CO_2$) | Average $CO_2$ (%) | Stack Gas Temp. (°F.) | Mean Entrained Particle Size (Microns) | Δ P Across Scrubber (in. $H_2O$) | Avg. Stack Gas Flow (ACFM)[1] | Avg. Stack Gas Flow (SDFM)[2] |
|---|---|---|---|---|---|---|---|---|
| 1A | Inlet | .214 | 7.8 | 310 | 2.88 | 3.2 | 35,400 | 24,200 |
| 1B | Outlet | .061 | 7.8 | 307 | 2.93 |  | 35,400 | 24,200 |
| 2A | Inlet | .208 | 10.6 | 310 | 2.54 | 4.2 | 35,400 | 24,200 |
| 2B | Outlet | .062 | 10.6 | 305 | 3.40 |  | 35,400 | 24,200 |
| 3A | Inlet | .219 | 8.5 | 310 | 1.82 | 5.8 | 41,500 | 28,400 |
| 3B | Outlet | .070 | 8.5 | 315 | 1.72 |  | 41,500 | 28,400 |
| 4A | Inlet | .154 | 10.1 | 310 | 1.70 | 7.2 | 41,500 | 28,400 |
| 4B | Outlet | .065 | 10.1 | 307 | 2.28 |  | 41,500 | 28,400 |
| 5A | Inlet | .178 | 10.7 | 310 | 2.42 | 10.2 | 43,200 | 29,600 |
| 5B | Outlet | .061 | 10.7 | 315 | 2.73 |  | 43,200 | 29,600 |
| 6A | Inlet | .235 | 9.55 | 310 | 1.82 | 10.5 | 43,200 | 29,600 |
| 6B | Outlet | .054 | 9.55 | 317 | 1.68 |  | 43,200 | 29,600 |

[1] Actual cubic feet per minute
[2] Standard cubic feet per minute

In addition to varying the rate at which the feed gas is passed through the mass of particulate solid material in a unit of the kind above-described, the rate at which the particulate solid is moved downward through the annular space between the two louvered cylindrical wall can be varied. The particulate solid can be moved at rates in the range of about 0.5 to 40 feet per hour and can in addition be moved only intermittently. Higher flow rates are employed with feed gases heavily loaded with finely divided solid material. Lower flow rates or intermittent flow where the particulate may be downmoving during as little as one-sixth of the operating period may be employed where the feed gas is lightly loaded with finely divided solids or when a very high percentage removal of the finely divided solid is desired.

The method and apparatus can be operated over a wide range of pressure. Finely divided solids contained in stack gases at near atmospheric pressure or in gases effluent from coal gasification units or refuse combustion disposal units which may be at 100 psi or above, can be effectively removed.

What is claimed is:

1. A process for removing finely divided solids from gas which comprises:
   a. providing an elongated annular mass of particulate contact material confined between two generally concentric cylindrical walls, the outer wall being perforated to form a louvered surface having vanes extending outwardly and inclined to the vertical at an angle of about 15° to 80° and louver openings sufficiently large to permit passage of most of the particles constituting the contact mass to pass through the openings and the inner wall having perforations which permit passage of the gas through the wall,
   b. passing a feed gas containing finely divided solids through the outer wall and through the annular mass of contact material into the space enclosed by the inner cylindrical wall,
   c. withdrawing gas having a substantially reduced content of finely divided solids from the space enclosed by the inner wall,
   d. moving the mass of particulate contact material downwardly by gravity flow through the annular space between the two walls at a rate between about one-half foot per hour and forty feet per hour whereby a minor proportion of the contact material passes through the louvers of the outer wall,
   e. removing contact material from the lower end of the annular space between the two walls at a rate such as to maintain the rate of downward movement of the mass of contact material in the range about ¼ foot per hour to 40 feet per hour,
   f. separating entrained finely divided solids from the removed contact material and then returning the contact material to the upper end of the annular space between the two walls.

2. The process defined in claim 1 wherein the downward movement of the mass of particulate contact material is intermittent.

3. The process defined in claim 2 wherein the intermittent downward movement of the contact material is adjusted so as to leave the contact material stationary during a substantial proportion, up to five-sixths of the on-stream period.

4. The process defined in claim 1 wherein the temperature of the contact material is maintained at a level above the water vapor dew point of the feed gas.

5. The process as defined in claim 1 wherein the feed gas is characterized by a substantial content of finely divided particles having diameters greater than 5 microns and is subjected to a cyclone separation step to remove particles having diameters greater than 5 microns prior to passing it through the outer cylindrical wall.

6. Apparatus for separating finely divided solids from gas comprising:
   a. a generally cylindrical vessel formed from an upper cylindrical section and a lower cylindrical section of larger diameter relative to the diameter of the upper section and so arranged that the lower portion of the upper section extends into the upper portion of the lower section forming an annular space between the two sections in the area of overlap, a gas inlet opening disposed in the upper portion of the lower section and so aligned that the gas enters the vessel along a path that is tangential to the cylindrical surface of the upper section,
   b. a first generally cylindrical wall member having a diameter less than that of the upper cylindrical section and disposed in the upper cylindrical section to provide an elongated annular space between said first wall member and the wall of the upper cylindrical section and in sealing engagement with the top portion of the vessel, and the annular space between the first wall member and the wall of the upper cylindrical section being in open communication with a solids outlet at the bottom of the vessel,
c. a second generally cylindrical wall member having a diameter less than said first wall member disposed in said first wall member to provide an elongated annular space between the two wall members, the space enclosed by said second wall member being in open communication with a gas outlet opening in the top of the vessel and with the solids outlet at the bottom of the vessel,
d. vertical solids elevating means exterior of the vessel,
e. first solid transport means following a path connecting the solids outlet opening in the bottom of the vessel with the bottom of the elevating means,
f. second solid transport means following a path connecting the top of the elevating means with a solids inlet opening in the top of the vessel,
g. solids separator means in the path traversed by one of said first and second solid transport means and having a substantially gas tight discharge outlet for removing separated finely divided solids,
h. a mass of particulate solid contact material filling the annular space between the two cylindrical wall members from the upper end of the second cylindrical wall member to the lower portion of the vessel, said mass being in open communication with the solids outlet opening,
i. the surface of the first cylindrical wall member being a louvered surface formed by perforating said wall to form outwardly extending louver vanes inclined to the vertical at an angle of about 15 to 80 degrees and having louver openings sufficiently large that most of the particles constituting the contact mass are capable of passing through the openings, said first cylindrical wall member being in open communication throughout the entire louvered surface thereof with said gas inlet opening, and
j. the surface of the second cylindrical wall being perforated to permit passage of the gas through the wall.

7. Apparatus for separating finely divided solids from gas comprising:
a. a generally cylindrical vessel having a gas inlet opening in its side wall, a gas outlet opening centrally disposed in its top, a solids outlet centrally disposed in its bottom and a solids inlet opening disposed in its top and disposed laterally from the gas outlet opening,
b. a first generally cylindrical wall member having a diameter less than that of the vessel and disposed in the vessel to provide an elongated annular space between said first wall member and the wall of the vessel and in sealing engagement with the top portion of the vessel, and the annular space between the first wall member and the wall of the vessel being in open communication with the solid outlet at the bottom of the vessel,
c. a second generally cylindrical wall member having a diameter less than said first wall member disposed in said first wall member to provide an elongated annular space between the two wall members, the space enclosed by said second wall member being in open communication with the gas outlet opening in the top of the vessel and with the solids outlet at the bottom of the vessel and the lower end of said second cylindrical wall member being closed by a downwardly tapered conical closure member, said conical closure having exteriorly shielded slots, said slots being sized to permit passage of particles of contact material hereinafter specified through them,
d. vertical solids elevating means exterior of the vessel,
e. first solid transport means following a path connecting the solids outlet opening in the bottom of the vessel with the bottom of the elevating means,
f. second solid transport means following a path connecting the top of the elevating means with the solids inlet opening in the top of the vessel,
g. solids separator means in the path traversed by one of said first and second solid transport means and having a substantially gas tight discharge outlet for removing separated finely divided solids,
h. a mass of particulate solid contact material filling the annular space between the two cylindrical wall members from the upper end of the second cylindrical wall member to the lower portion of the vessel, said mass being in open communication with the solids outlet opening,
i. the surface of the first cylindrical wall member being a louvered surface formed by perforating said wall to form outwardly extending louver vanes inclined to the vertical at an angle of about 15° to 80° and having louver openings sufficiently large that most of the particles constituting the contact mass are capable of passing through the openings, said first cylindrical wall member being in open communication throughout the entire louvered surface thereof with said gas inlet opening, and
j. the surface of the second cylindrical wall being perforated to permit passage of the gas through the wall.

8. Apparatus for separating finely divided solids from gas comprising:
a. a generally cylindrical vessel having a gas inlet opening in its side wall, a gas outlet opening centrally disposed in its top, conical means defining a solids outlet centrally disposed in its bottom and a solids inlet opening disposed in its top and disposed laterally from the gas outlet opening,
b. a first generally cylindrical wall member having a diameter less than that of the vessel and disposed in the vessel to provide an elongated annular space between said first wall member and the wall of the vessel and in sealing engagement with the top portion of the vessel, and the annular space between the first wall member and the wall of the vessel being in open communication with the outlet at the bottom of the vessel,
c. a second generally cylindrical wall member having a diameter less than said first wall member disposed in said first wall member to provide an elongated annular space between the two wall members, the space enclosed by said second wall member being in open communication with the gas outlet opening in the top of the vessel and with the solids outlet at the bottom of the vessel and the lower end of the second cylindrical wall member lying below the lower end of said first cylindrical wall member by a distance such that the shortest distance from the bottom of said second cylindrical wall member and said conical means is not greater than about 10 times the shortest distance from the bottom of said first cylindrical wall member and said conical means, d. vertical solids elevating means exterior of the vessel, f. first solid transport means following a path connecting the solids outlet opening in the bottom of the vessel with the bottom of the elevating means, f. second solid transport means following a path connecting the top of the elevating means with the solids inlet opening in the top of the vessel, g. solids separator means in the path traversed by one of said first and second solid transport means and having a substantially gas tight discharge outlet for removing separated finely divided solids, h. a mass of particulate solid contact material filling the annular space between the two cylindrical wall members from the upper end of the second cylindrical wall member to the lower portion of the vessel, said mass being in open communication with the solids outlet opening, i. the surface of the first cylindrical wall member being a louvered surface formed by perforating said wall to form outwardly extending louver vanes inclined to the vertical at an angle of about 15 to 80 degrees and having louver openings sufficiently large that most of the particles constituting the contact mass are capable of passing through the openings, said first cylindrical wall member being in open communication throughout the entire louvered surface thereof with said gas inlet opening, and j. the surface of the second cylindrical wall being perforated to permit passage of the gas through the wall.

* * * * *